(12) United States Patent
Motamedi et al.

(10) Patent No.: US 7,706,573 B1
(45) Date of Patent: Apr. 27, 2010

(54) REMOTE DISTANCE-MEASUREMENT BETWEEN ANY TWO ARBITRARY POINTS USING LASER ASSISTED OPTICS

(76) Inventors: Manouchehr E. Motamedi, 756 Paseo Dc Leon, Newbury Park, CA (US) 91320; Ali E. Dabiri, 2290 Middleton Way, San Diego, CA (US) 92109

( * ) Notice: Subject to any disclaimer, the term of this patent is extended or adjusted under 35 U.S.C. 154(b) by 1127 days.

(21) Appl. No.: 11/230,226

(22) Filed: Sep. 19, 2005

(51) Int. Cl.
*G06K 9/00* (2006.01)
(52) U.S. Cl. .................................................... 382/106
(58) Field of Classification Search ............... 359/196.1, 359/197.1, 198.1, 199.1, 202, 212.1, 212.2, 359/213.1, 214.1, 223, 224, 290–295; 250/234, 250/252.1; 235/462, 470
See application file for complete search history.

(56) References Cited

U.S. PATENT DOCUMENTS

| 5,903,380 | A | 5/1999 | Motamedi et al. ...... | 359/224.15 |
| 6,094,289 | A | 7/2000 | Moranski et al. ....... | 359/223.14 |

OTHER PUBLICATIONS

M. E. Motamedi, Optical Engineering Journal, special issue in "Micro-opto-electro-mechanical systems", Optical Eng. vol. 36, No. 5, May 1997.
M.E. Motamedi, et al, "MOEM Scan Engine for Barcode Reading and Factory Automation," SPIE Proceeding of Miniaturized Systems with Microoptics and Micromechanics III, vol. 3276, pp. 66-80 San Jose, 1998.

*Primary Examiner*—Samir A Ahmed
*Assistant Examiner*—Atiba O Fitzpatrick

(57) ABSTRACT

The disclosed method measures the distance between two arbitrary points of interest from the user position by determining the range and angle between the two points. To measure the angle between the two points, a first method uses a micro-opto-electro-mechanical scanner to form a scan line between the two points of interest. A scan angle is determined based on the applied AC voltage needed to cause the endpoints of the scan line to coincide with the points of interest. The second method, an image-processing method, is applied to determine the angles between the points of interest. A Microprocessor uses captured images including the points of interest to determine the angle between the points. In both methods, the Microprocessor calculates the distance between the two points of interest by using the determined angle, together with the measured ranges and sends the calculated distance to a display.

7 Claims, 6 Drawing Sheets

REMOTE DISTANCE-MEASUREMENT BETWEEN ANY TWO ARBITRARY POINTS USING LASER ASSISTED OPTICS

FIELD OF THE DISCLOSED METHOD & APPARATUS

This method and apparatus is related to remote distance measurement and more specifically related to laser scanning, ultrasonic detection, and optical tape imaging applications for distance measurement of two arbitrary points in space.

BACKGROUND

Regular measuring tapes similar to Leverlock Tape manufactured by "Stanley Bostitch" and demonstrated at http://www.stanleybostitch.com/site, are operating manually. Such tapes are presently available for all types of consumers and for all types of measurements excluding measuring the distance between multiple points in space. Similar manual measuring tapes have been introduced to consumers, which claim to eliminate misreading the measurement by digitally displaying the measurement on LCD readout. Some of these measuring tapes are equipped with push buttons to change the measuring unit from inches to centimeters or some other desirable units. All these prior art-measuring devices are manually operated; they are heavy, unreliable, and cumbersome to use.

Some other prior art distance-measuring devices do not require folded tape to measure distance. They use ultrasonic radar similar to those available at Aubuchon Hardware and demonstrated at http://tools.aubuchonhardware.com/site. However, these devices have low resolution, since it is hard to aim sound waves including those assisting laser beams to illuminate a target area in order to aid in attaining accuracy and they are only applicable to single point distance measurement.

Laser optical scanners have also been used as measuring tools. Such scanners include those that are manufactured by Pacific Laser Systems and are demonstrated at http://www-.plslaser.com/site (See Model PLS2). However, these devices are mainly for measuring surface alignment and they are not typically produced as portable handheld tools, or if they are, they are very expensive. There are three other drawbacks for these systems: (1) the scan engine is likely to be a rotating mirror, which is bulky, heavy, and unreliable; (2) such systems cannot measure angles and therefore, cannot measure the distance between two arbitrary points in space; (3) such systems are hybridized and scanning is not controllable and therefore, they are not compatible with smart sensors and wireless systems.

BRIEF SUMMARY

Two measurement systems are disclosed herein. Each disclosed system has the ability, among other things, to remotely measure the distance between any two target points visible to the measurement system. The first measurement system is based on an optical scanner. The second measurement system is based on image processing. Both systems preferably use the same distance measurement method. The presently disclosed measurement systems provide an electronic data collection mechanism. The addition of electronic data collection allows the measurement systems to be integrated into a smart sensor system.

The first system makes measurements using a scanning technique. This system is based on micro-opto-electro-mechanical systems (MOEMS) technology. MOEMS technology merges MEMS (micro-electro-mechanical systems) and MO (micro-optics) as described in, the special issue of Optical Engineering Journal, in "Micro-opto-electro-mechanical systems", Optical Eng. Vol. 36, No. 5, May 1997. The system includes a MOEMS scanner engine. Such an engine is described in SPIE Proceedings, "MOEM Scan Engine for Barcode Reading and Factory Automation", SPIE Proceeding of Miniaturized Systems with Microoptics and Micromechanics III, Vol., 3276, p.p. 66-80, 1998. The scanner engine is used for making remote distance measurements.

In this system, a laser beam is scanned by the scanner between a first target point, A and a second target point B. Accordingly, the end points of the scanned beam are the target points, A and B. Basic geometry is used to find the desired distance between the two points, A and B. Accordingly, the desired distance can be calculated from the angle formed between the first and second laser beams (hereafter referred to as the "scan angle") and measurements of the distance from the scanner to each of the two target points, A and B. The hardware and software components for making distance measurements and performing the geometric calculations are contained in a controller, such as a Microprocessor.

The first system is used whenever a scanned beam of laser light can be directed from a MOEMS scanner towards the two target points. The user points the device at the target points and adjusts the scan angle using a user input device, such as an angle adjust knob, to cause the endpoints of the scanned beam to coincide with both the first target point and the second target point, between which the user desires to find the distance. A trigger signal is sent to a rangefinder causing the rangefinder to determine the distance between the user and each of the two target points. A controller, such as a Microprocessor, uses the scan angle, together with the distances to the two target points and geometry, to calculate the distance between the two target points. The Microprocessor then preferably sends this data to a display device.

The second system makes measurements based on image processing. This second system combines image processing with a distance measurement to remotely determine the distance between two target points, A and B, within the field-of-view of the system. A measurement is then made of the distance between the device and each of the two target points, A and B using a rangefinder as explained in scanning method. An imaging system capable of processing an image of the scene is used to measure the angle between the two target points. If both target points are within a single image to be processed by the imager, then the angle can be obtained from that single image. However, in accordance with one embodiment of the disclosed method and apparatus, if each of the two target points, A and B are presented in separate images, the image processor then combines information together from as many images as necessary to image the entire space between the two target points in order to obtain the required angle. The imaging device information is preferably sent to a handheld Microprocessor. By using the determined angle, together with the distances to the two points and geometry, the microprocessor calculates the distance between the two points of interest and sends information to a display device.

In both disclosed systems an optical or optical/ultrasonic rangefinder based on a time-varying modulation is used for distance measurement.

DETAILED DESCRIPTION

This disclosure describes two measurement systems and associated methods that have the ability to remotely measure the distance between any two points within a field-of-view in a space. The first system is a scanning measurement system based on laser light scanning, and the second system is an imaging measurement system based on image processing. Each of the two systems includes a single point distance measurement and a measurement of an angle between the two points. The single point distance (range) is the distance from where a user stands to an arbitrary point in space. This measurement is determined by a rangefinder and is identical in each of the two disclosed systems. The angle measurement method is different in each system and will be discussed separately.

Two methods for measuring the range are disclosed herein. However, it will be understood that several other well-known methods might be applicable to the presently disclosed method and apparatus. Accordingly, while the following description of the disclosed method and apparatus refers to making range measurements to the two points of interest one at a time, it will be clear to those skilled in the art that these range measurements can be made simultaneously.

The first method of range finding uses optical radar. "Optical radar", as used herein, refers to a method by which distance to a target point is determined by a time-varying modulation of the laser combined with detection, typically of a reflection of the laser beam from a target point. The simplest such technique is to pulse the laser and determine the roundtrip distance by dividing the time required for the pulse to return by the speed of light. More sophisticated optical radar techniques involve frequency modulation of the laser and coherent detection. Such "optical radar" techniques are currently offered in commercial products.

The second method to implement the rangefinder process is to use acoustic radar. "Acoustic radar", as used herein, refers to a method by which distance is determined by a time-varying modulation of a high frequency sound combined with detection, typically of the reflection of the high frequency sound after striking the target point. The simplest such technique is to pulse high frequency sound waves and determine the roundtrip distance by dividing the time required for the pulse to return, by the speed of sound.

Each of the two disclosed measurement systems is discussed in detail below. In each of the two measurement systems, the rangefinder could be any one of the two methods discussed above or any other prior art methods, depending upon the user requirements, and desired price of the system.

A. Scanning Measurement System

Figure 1A:
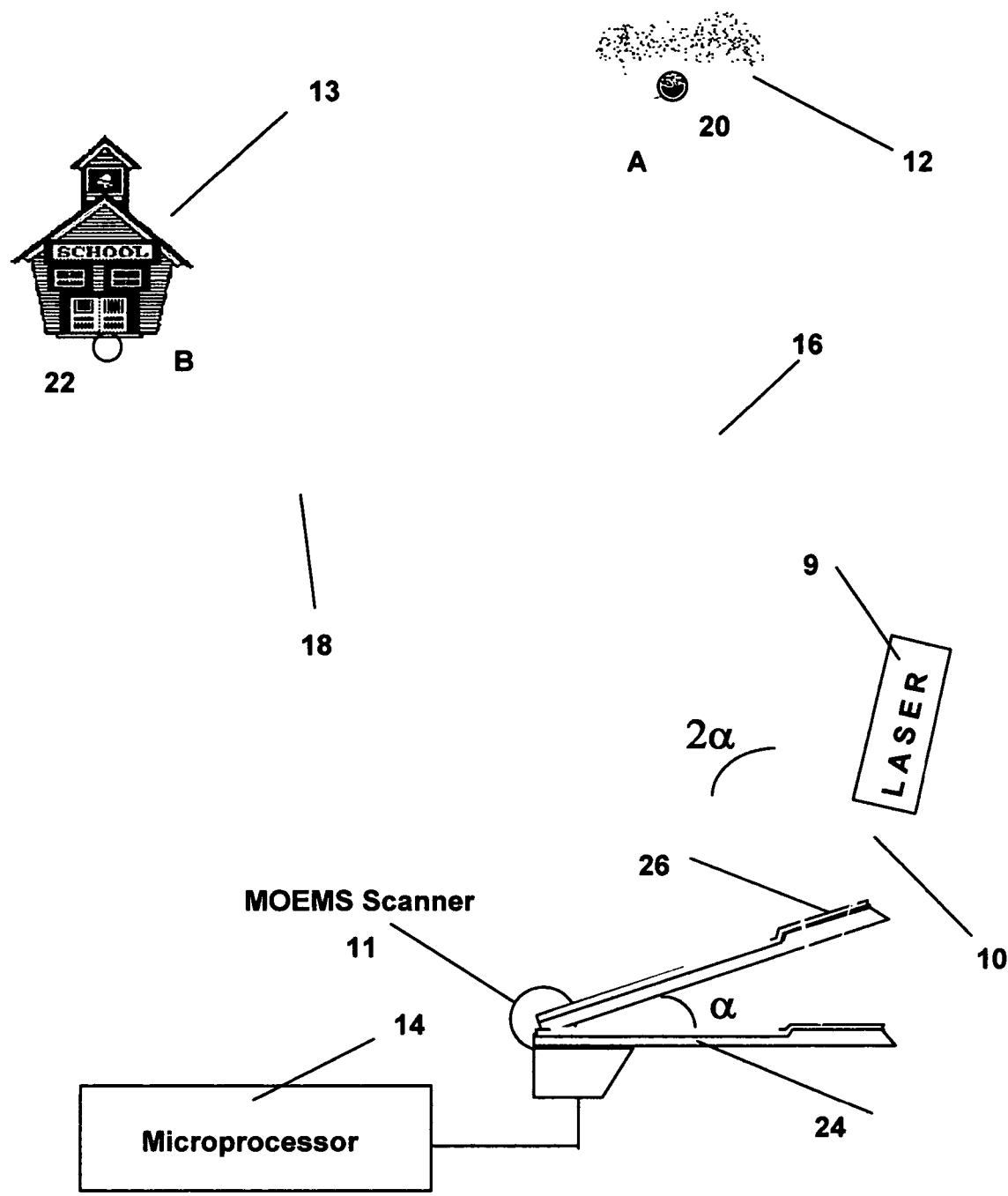
FIG. 1A is a schematic diagram of the apparatus for remote distance measurement between two arbitrary points in space using the disclosed scanning technique.

FIG. 1A is a schematic diagram of the apparatus for remote distance measurement between two arbitrary points in space, A and B, using the disclosed scanning technique. A laser 9, generates a laser beam 10. The laser beam 10 is scanned by a MOEMS scanner 11 between the two points, A and B. Point A is a specific point in a first scene 12. Point B is a specific point in a second scene 13. The endpoints of a first scan beam 16 and second scan beam 18 coincide with points A and B. Geometry is used to find the desired distance based upon the scan angle $2\alpha$ and measurements of the distance from the scanner 11 to each of the two endpoints 20 and 22 of the scan beams 16 and 18. It should be noted that the scan angle $2\alpha$ can be measured as either the angle formed between the two scan beams 16 and 18 or two times of the angle $\alpha$ formed between the two positions of a silicon cantilever beam 24 of the scanner 11. The hardware and software components for distance measurement and geometry calculations are contained in a controller, such as a Microprocessor 14.

Figure 1B:
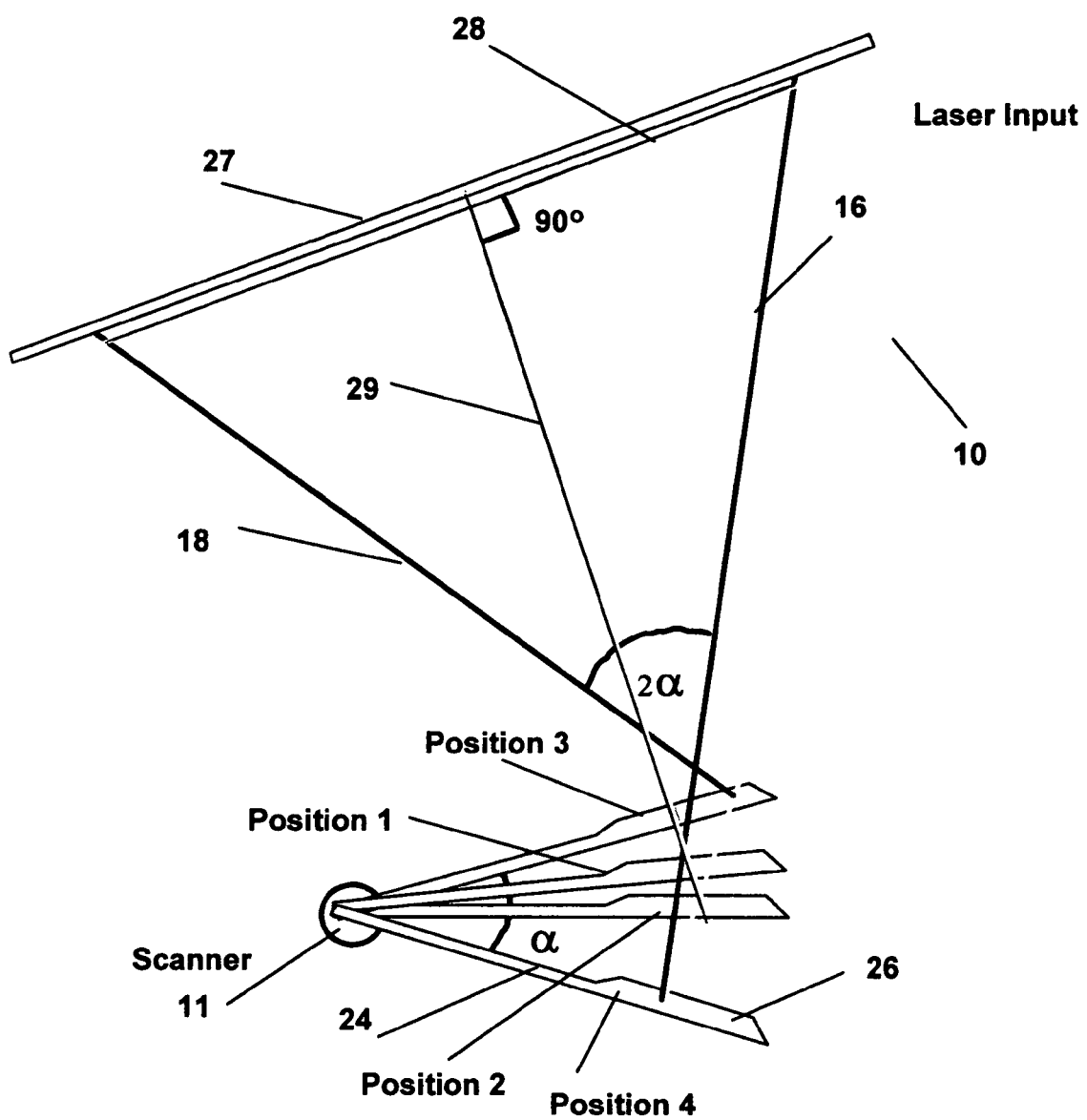
FIG. 1B is a detailed illustration of the scanner shown in three positions.

FIG. 1B is a more detailed illustration of the angles formed by the scan beams 16 and 18. Operation of the scanner 11 is described as follows. A scanning mirror 26 is built at the end of the silicon cantilever beam 24. When this cantilever beam 24 is fabricated, it is bent slightly upward as the result of internal material stress, resulting in position 1, as shown in FIG. 1B. Application of a positive DC voltage to the cantilever beam 24 bends the cantilever beam 24 downward into position 2 at which the scanning mirror 26 becomes horizontal. Likewise, if a negative DC voltage is applied, the cantilever beam 24 bends upward from position 1. During operation, application of an AC voltage causes the scanner to scan between positions 3 and 4.

When the laser beam 10 strikes the scanning mirror 26, the reflection from the mirror 26 forms a stationary circular beam directed to a target plane 27, where target plane 27 is any plane perpendicular to the line traversed by the reflected laser beam 29 when the cantilever beam 24 is horizontal in position 2 (DC bias is applied and AC voltage is at zero volt). The circular dimension of the reflected beam 29 is a function of the distance between the target plane 27 and the scanner 11, and how well the laser beam 10 is collimated.

When an AC voltage at a resonant frequency of the scanner 11 is applied to the scanner 11, the laser will scan between light beams 16 and 18, forming a straight scan line 28 along the target plane 27. The flatter and less distorted the scanning mirror 26, the straighter the scan line 28 formed on the target plane 27. If an AC voltage is applied with a DC bias that places the cantilever beam 24 in position 2 (see FIG. 1B), FIG. 1A and FIG. 1B can be seen as illustration of the movement of the scan beams 16 and 18. In this case, the angle formed between the scan beams 16 and 18 is referred to herein as the "scan angle" $2\alpha$. Note that scan angle $2\alpha$ can also be measured as the two times of angle $\alpha$ between the position 3 and position 4, of the cantilever beam 24.

Figure 2:
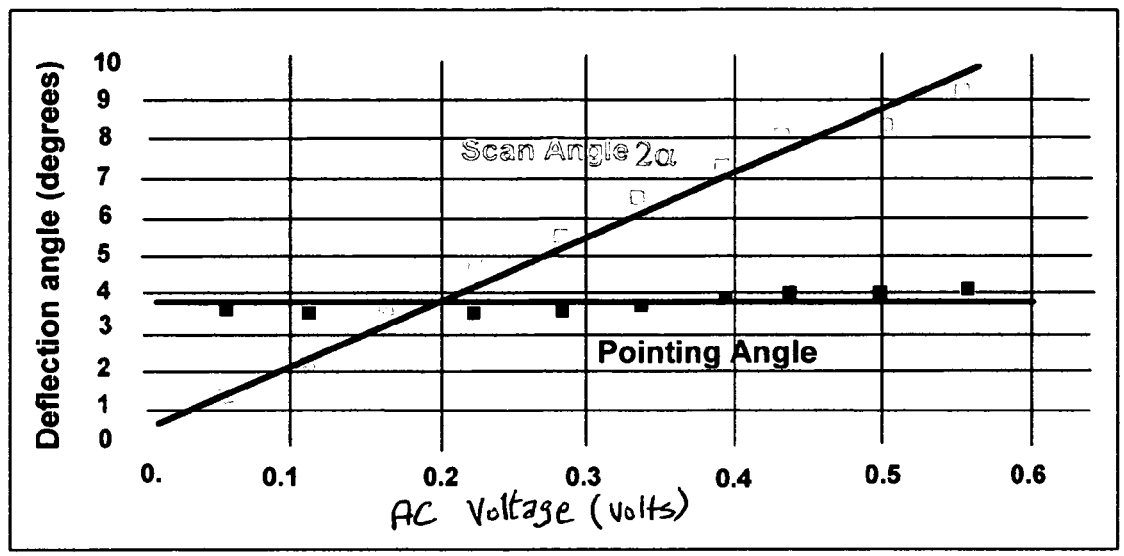
FIG. 2 illustrates the measurement of angles as the function of AC applied voltage to a MOEM scanner.

FIG. 2 illustrates the measurement results of the scan angles $2\alpha$ as a function of an AC voltage applied to a MOEM scanner 11 at the required DC bias. It can be seen that the required DC bias applied in FIG. 2 results in a pointing angle of approximately 4 degrees. The pointing angle is the angle of the laser beam when strikes on the target plane and when system is at zero AC voltage (not scanning). Pointing angle generally defines to be zero at a zero DC bias. When a required DC bias is applied, the pointing angle changes and stays in some new position angle during the operation. In the case of the FIG. 2, this position angle is 4 degrees. FIG. 2 also illustrates that the pointing angle remains essentially constant irrespective of the level of the AC voltage applied. Furthermore, in the embodiment shown in FIG. 2, the relationship between the scan angles $2\alpha$ for different AC voltages is essentially linear through at least some limited range of AC voltages. This is a function of both the quality of the scanning mirror 26 (mirror flatness) and the linearity of the deflection of the cantilever beam 24 with respect to the voltage applied.

Figure 3:
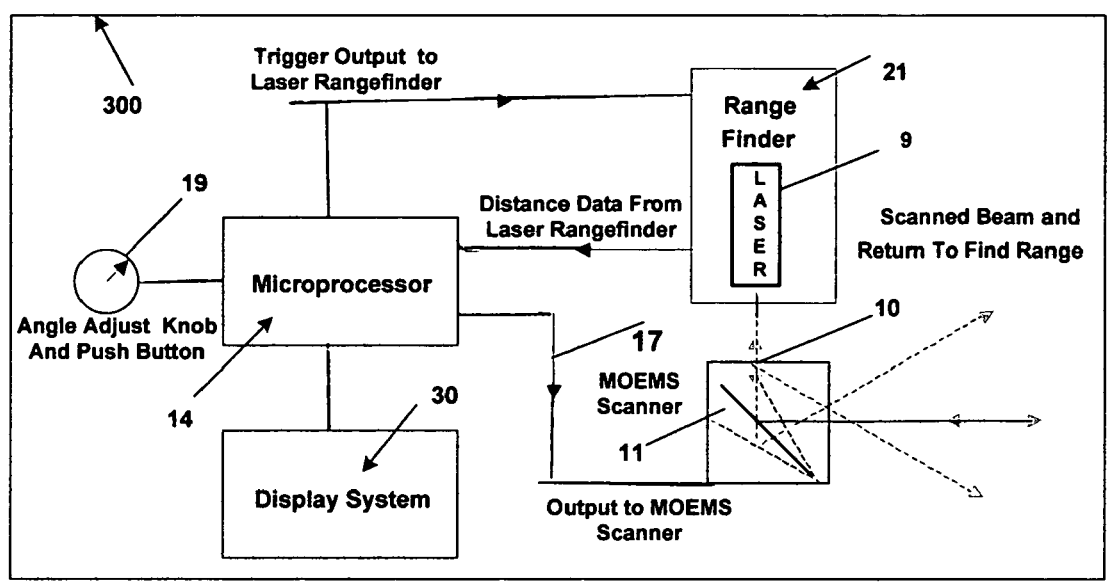
FIG. 3 is a functional block diagram of one implementation of a scanning measurement system.

FIG. 3 is a functional block diagram of one implementation of a scanning measurement system 300. It should be noted that the components of the system 300 may be integrated into the same package, or each may be discretely packaged. To measure the range of point A and point B, light 17 from a laser 9 within a rangefinder 21 is reflected by a MOEMS scanner 11, such as the MOEMS scanner 11 shown in FIGS. 1A and 1B. A user input device, such as an angle adjust knob 19, coupled to the Microprocessor 14 allows a user to adjust the pointing vector of the light reflected from the scanner 11 to cause the light from the rangefinder 21 to strike a point of interest, such as point A or point B in FIG. 1A. It will be understood by those skilled in the art that the user input device may be any device that allows a user to control the amount of AC voltage applied to the scanner 11 in order to cause the endpoints of the scan line 28 (see FIG. 1B) to coincide with the points of interest A or B. As discussed earlier, the rangefinder 21 can use any of the methods suggested for the single point distance measurement depending the desired cost, required performance, and the particular measurement application.

To measure the scan angle $2\alpha$ between the two desired points 20 and 22 (see FIG. 1A), a table is generated according to FIG. 2, which cross-references the scan angle $2\alpha$ with the amount of AC voltage required to cause the scan angle $2\alpha$ to be generated. Accordingly, by knowing the amount of AC voltage required to cause the end points 20 and 22 of the scan line 28 to coincide with the points of interest, the angle $2\alpha$ between the points of interest can be determined. The device may use supplemental optics to magnify the scan angle $\alpha$ of the MOEMS scanner if necessary.

The Microprocessor 14 uses the scan angle $2\alpha$, together with the distances to the two points A and B to calculate the distance between the two points. The Microprocessor 14 then sends this information to a display device 30. In one embodiment of the disclosed method and apparatus, the distance is provided to the display device 30 as soon as the Microprocessor 14 calculates the distance. The display device 30 immediately displays the information provided by the Microprocessor 14. This is hereafter referred to as display in "real time". In the alternatively, the calculated distance can be stored for display upon request at a later time. The system 300 may include a microphone and audio processor to allow voice activated commands to be interpreted and acted upon. In addition, the system 300 may include a speaker coupled to the audio processor to give an audible response. In either the case, the audio processor may be included in the functional block of the Microprocessor 14 or the audio processor may be independent of the Microprocessor 14.

Motion of the scanner 11 occurring while a measurement is being made may result in a distance measurement error. If the scan time is short, then this error will typically be very small. While this error is negligible for the most practical cases, in one embodiment of the disclosed system, such motion can be accounted for by adding an accelerometer to the scanner 11 and coupled to the Microprocessor 14 to compensate for any motion detected by the accelerometer. In one embodiment, the accelerometer is a gyro accelerometer. Alternatively, the accelerometer may be a mercury based accelerometer, a pendulum accelerometer, or any other accelerometer well known in the industry.

B. Imaging Measurement System

Figure 4:
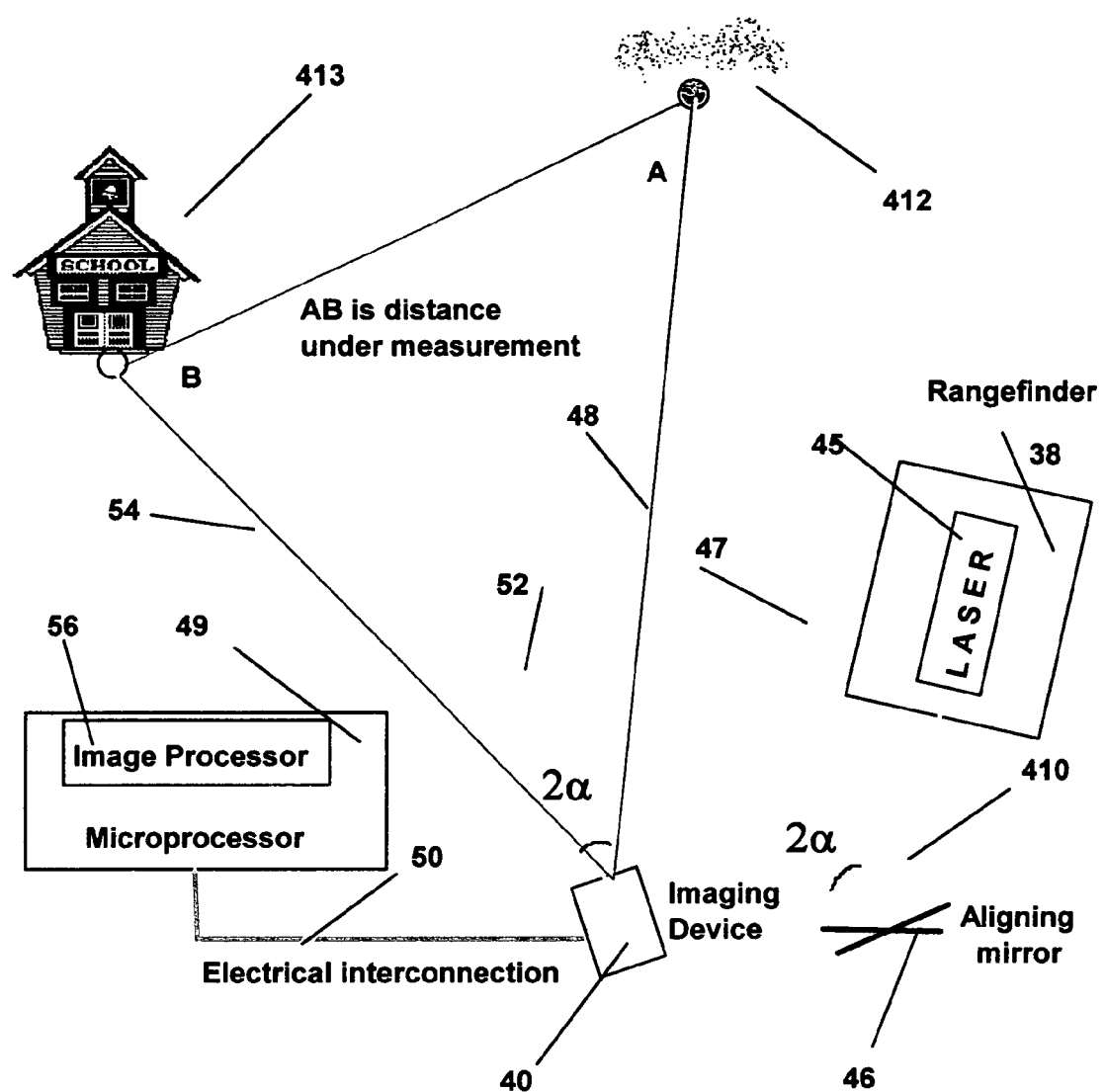
FIG. 4 is a schematic diagram of a system for remote distance measurement between two arbitrary points in space using imaging technique.

FIG. 4 is a schematic diagram of a system for remote distance measurement between two arbitrary points in space using an imaging technique. The system uses an imaging device 40 and a rangefinder 38 to remotely determine the distance between any two points within a field-of-view, such as point A from scene 412 and point B from scene 413. In one embodiment of the disclosed method and apparatus, the imaging device is a linear photo detector array. The user points the rangefinder 38 so that light, such as a laser beam 410 generated by laser 45, strikes a light beam redirecting device, such as a mirror 46. Alternatively, the light beam redirecting device is an aiming mirror. The reflected laser light 47 from the mirror 46 illuminates the first point, A. Some of the laser light 48 that is reflected from the first point A is captured by the imaging device 40. The imaging device 40 is coupled to a controller, such as a Microprocessor 49, by connection 50. The imaging device 40 indicates to the Microprocessor 49 that this is the first point for the measurement. Alternatively, the Microprocessor 49 determines that the image taken by the image device 40 is the image of the first point of interest.

In addition to the light 48 that is reflected by point A to the imaging device 40, some of the light 47 is reflected back along the path to the mirror 46 and the reflects back into the rangefinder 38. The rangefinder 38 then determines the range to point A based on the difference between the transmitted light 410 and the light that is received back at the rangefinder 38. As noted previously, the manner in which this range measurement is made is well known and is not significant to the disclosed system, other than as might be appropriate to the particular application for which the system is being used. For example, in one embodiment, the distance measurement may be based upon the difference in the phase of the light received by the rangefinder 38 with respect to the phase of the light transmitted by the laser 45. Alternatively, the measurement may be based on the time at which a pulse is transmitted and the time at which the pulse returns to the rangefinder 38.

The user then points the mirror 46 so that the laser beam 410 bounces off the mirror 46 and the reflected beam 52 illuminates the second point, B. The imaging device 40 captures the laser light 54 that is reflected from the second point B. The imaging device 40 indicates to the Microprocessor 49 that this is the second point for the measurement. Alternatively, the Microprocessor 49 determines that this image is of the second point of interest.

The imaging device 40, which is looking at the scene, is used to measure the angle $2\alpha$ between the two points, A and B. Since imaging device 40 and aligning mirror 46 are at the same handheld package, the angle between light 48 and 54 is the same angle $2\alpha$ that we defined between light 47 and light 52. If both points are within the initial field-of-view of the imaging device 40, then the angle 19 can be obtained from a single image. In accordance with one embodiment of the disclosed method and apparatus, greater resolution can be obtained by using an imaging device 40 with a smaller field-of-view, but whose field is coincident with the active scenes, so that its field follows the laser lights 47 and 52, as the laser 45 is pointed to the active scenes. An image processor 56 can then combine information from several "frames" between the points A and B to determine the angle of interest $2a$. It should be noted that the image processor 56 might be included within the Microprocessor 49 as shown in FIG. 4. However, in an alternative embodiment, the image processor 56 may be either a discrete device or located within the imaging device 40.

Figure 5:
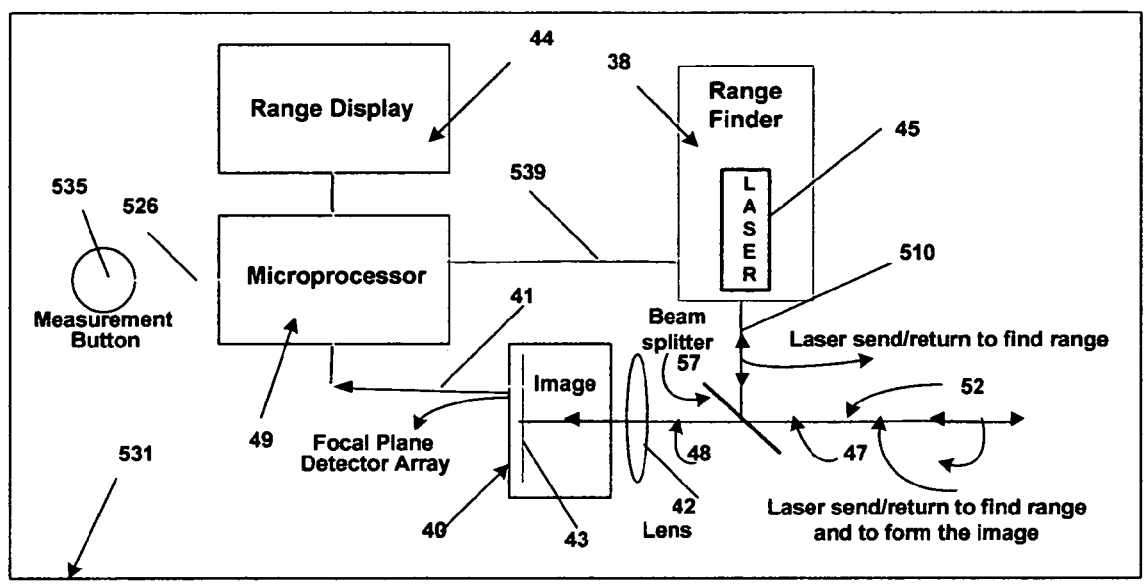
FIG. 5 is a schematic diagram of one implementation of an imaging measurement technique.
Figure 1A:
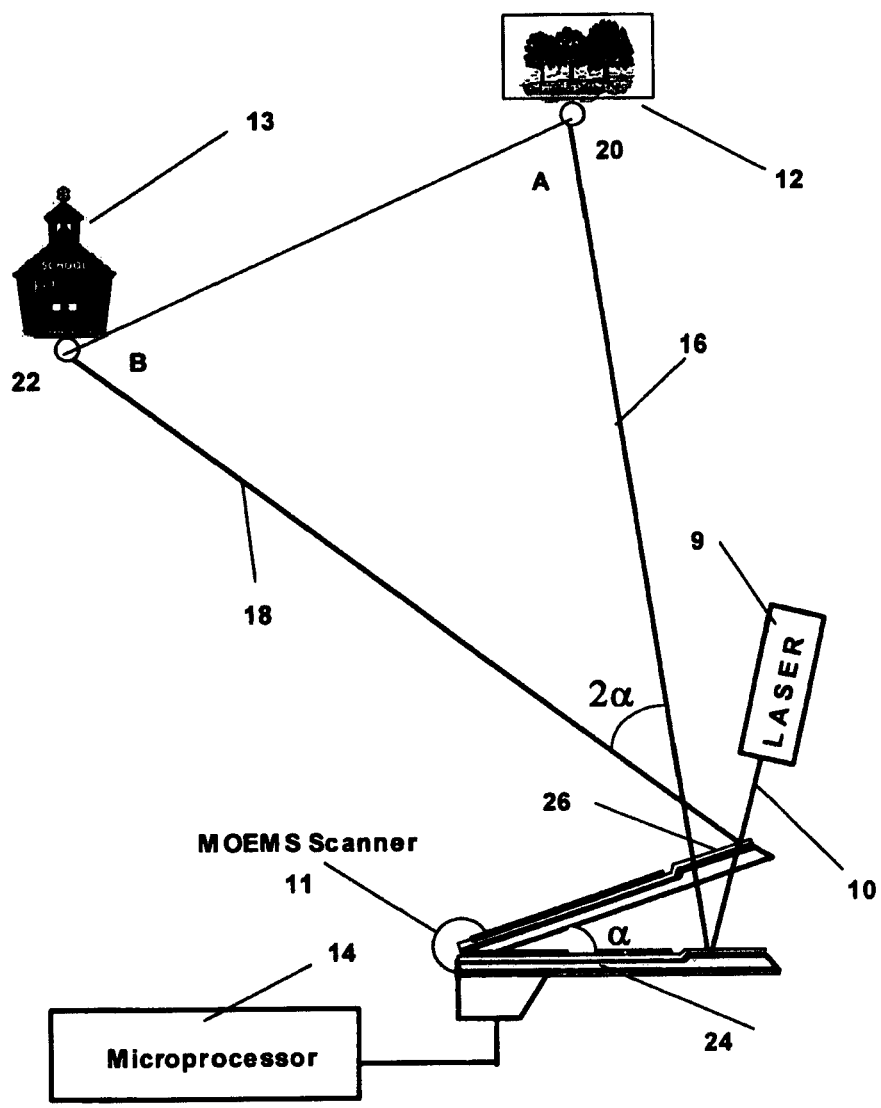
Figure 1B:
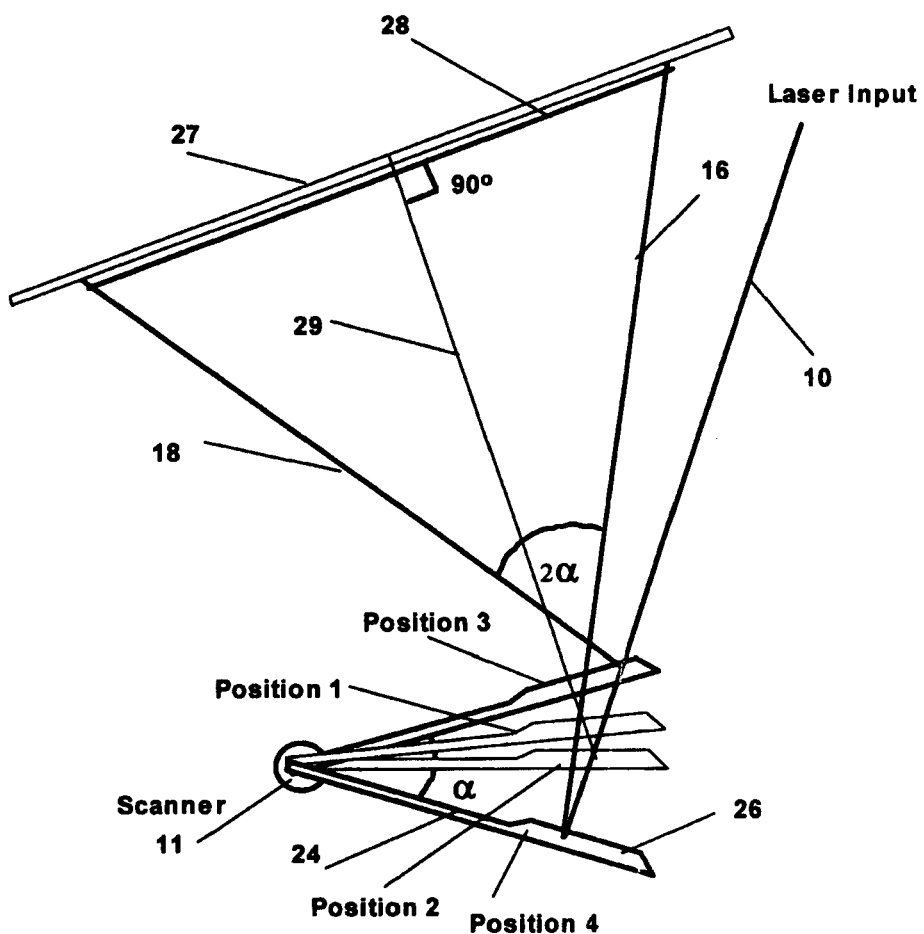
Figure 2:
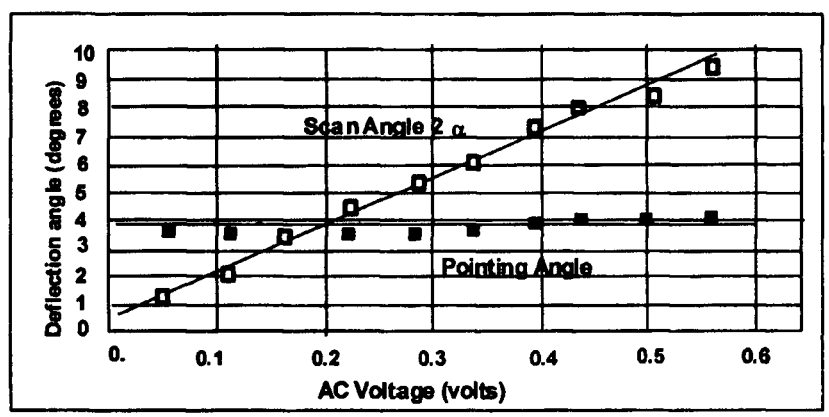
Figure 4:
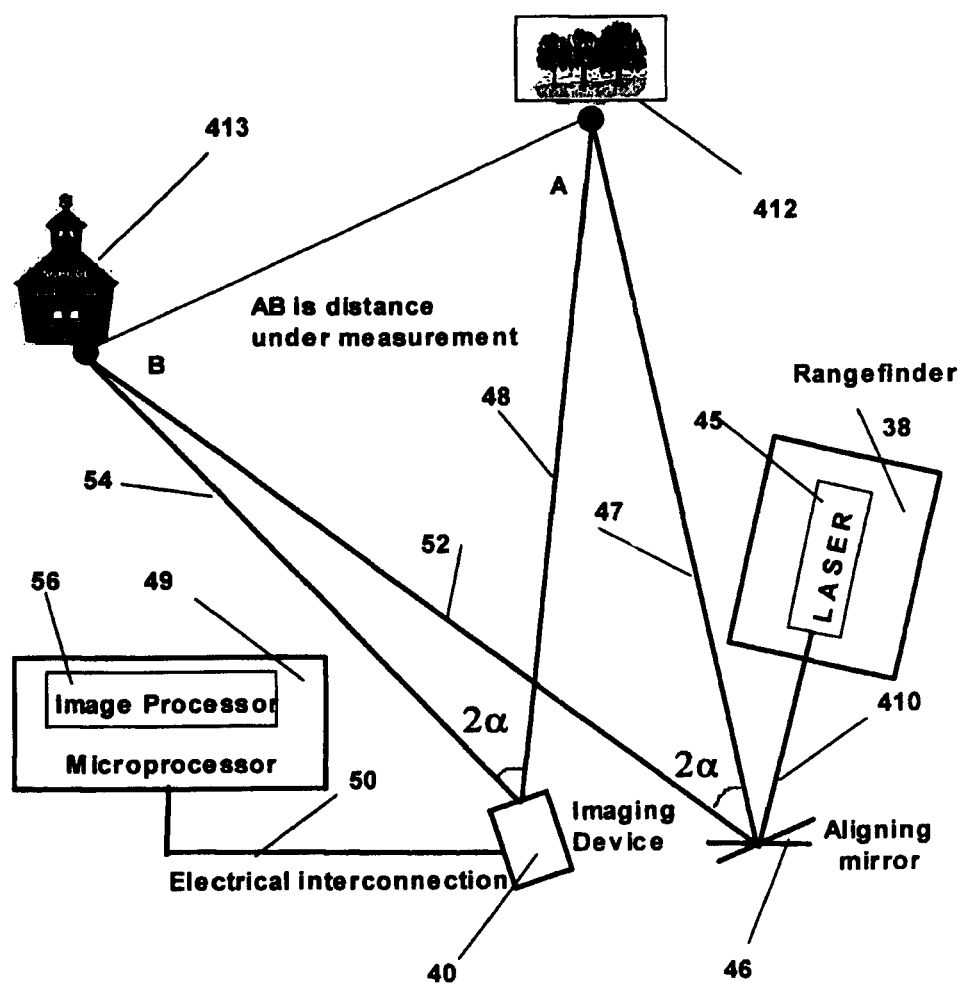
Figure 1A:
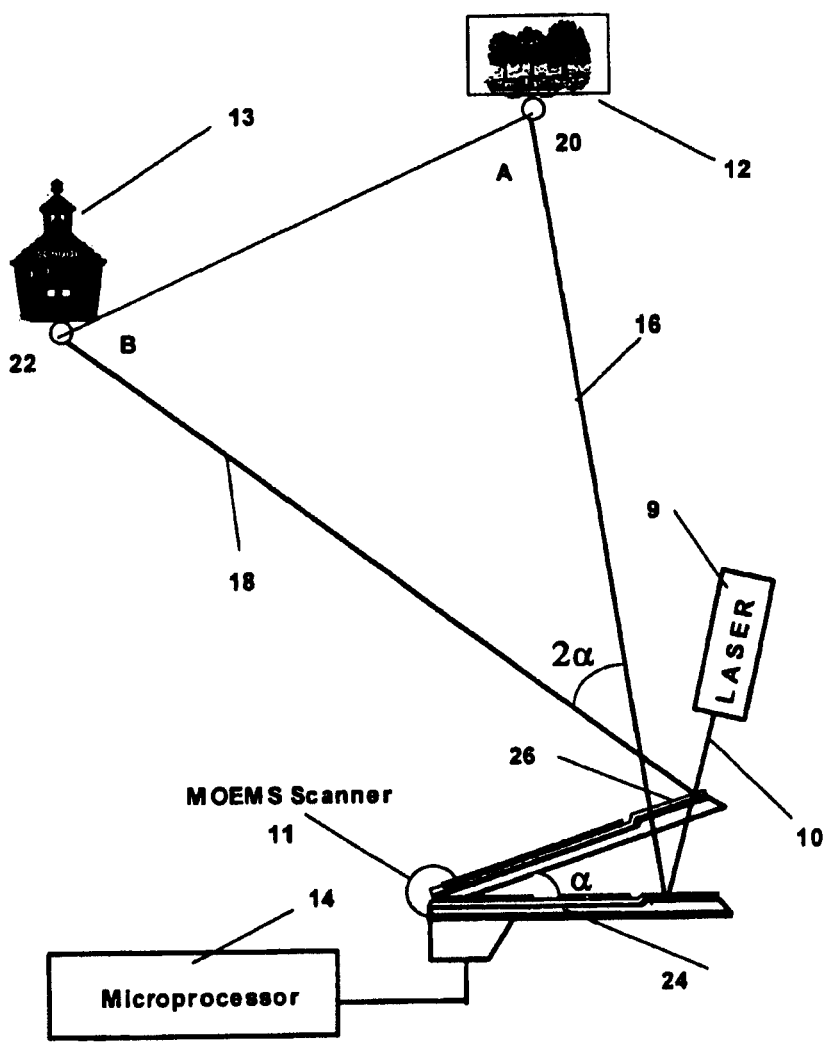
Figure 1B:
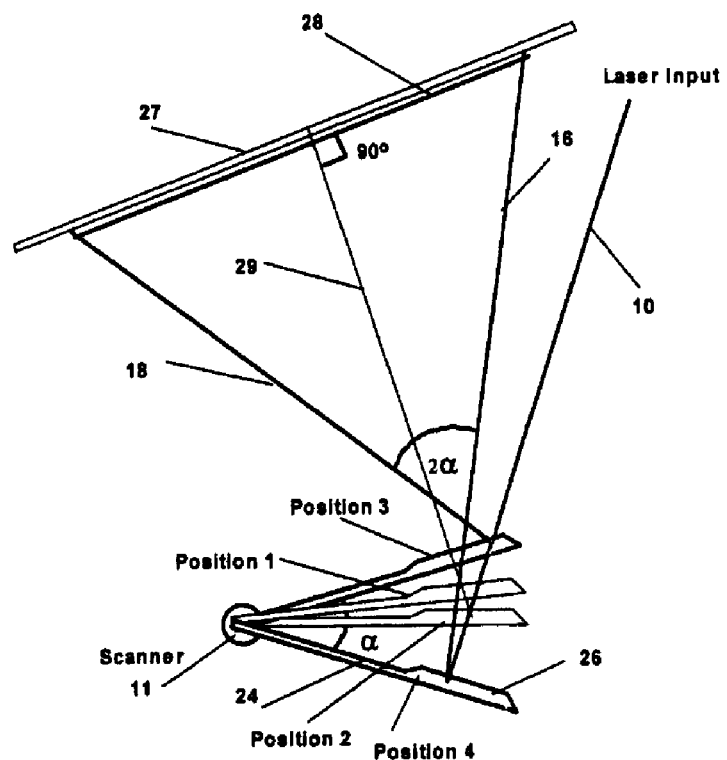
Figure 2:
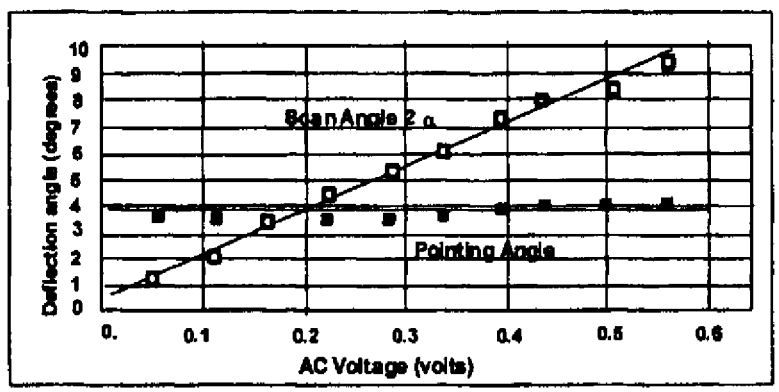
Figure 4:
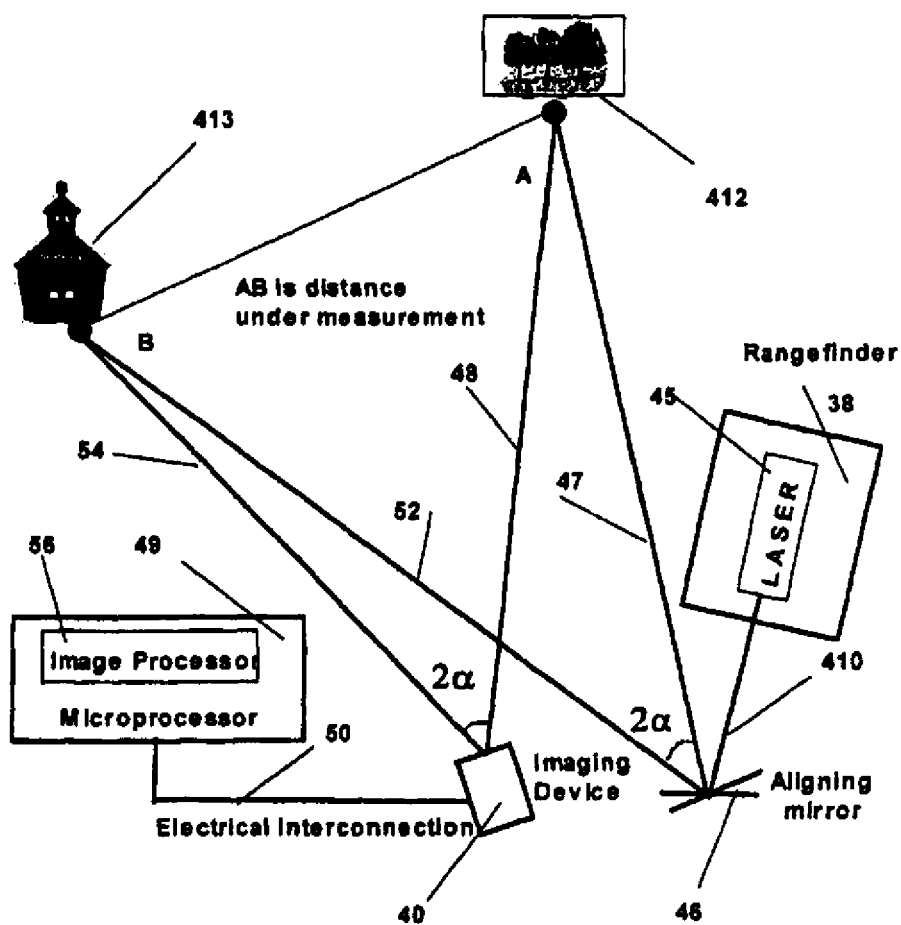

FIG. 5 shows one implementation of the imaging measurement system 531 operated by Microprocessor 49. It should be noted that the components of the system 531 may be integrated into the same package, or each may be discretely packaged. The laser beam 510 generated by the laser 45 within the rangefinder 38 is reflected by the beam splitter 57 and directed at point A (see FIG. 4) by the user's positioning of the beam splitter 57. The user then presses a measurement button 535. The signal enters the Microprocessor 49 through connection 526. The Microprocessor 49 then takes a single point distance reading from the rangefinder 38 through connection line 539. A portion of the light reflected from point A is directed by the beam splitter 57 into the rangefinder 38. In addition, some of the reflected light 48 from point A is directed to the imaging device 40, which starts capturing data from the focal plane array 43 to Microprocessor through connection line 41. For this process, a lens 42 captures light within its field-of-view of the lens and forms an image on the focal plane array 43. The incoming laser light 48 is aligned to be coaxial with the image (i.e. the laser light 48 is directed to the center of the field-of-view of the lens 42). Thus, the image will contain the spot from the laser beam as it illuminates the point A. The laser 45 may be modulated and the light emitted synchronously detected to make it easier to identify the pixel or pixels it occupies in the image.

The user directs the laser light 52 to the point B and repeats the same procedure to measure the single point distance measurement of the point B and to capture the image associated with and in the field of view with point B.

The Microprocessor 49 uses the two captured images to determine the angle 2α between the two points A and B (see FIG. 4). The Microprocessor 49 then combines this information together with the distances to the two points as determined by the rangefinder 38, and using geometry, calculates the distance between the two points of interest A and B. The Microprocessor 49 then sends this information to a range display device 44. In one embodiment of the disclosed method and apparatus, the distance is provided to the display device 44 as soon as the Microprocessor 49 calculates the distance. The display device 44 immediately displays the information provided by the Microprocessor 49. This is hereafter referred to as display in "real time". Alternatively, the calculated distance can be stored for display upon request at a later time. The system 531 may include a microphone and audio processor to allow voice activated commands to be interpreted and acted upon. In addition, the system 531 may include a speaker coupled to the audio processor to give an audible response. In either the case, the audio processor may be included in the functional block of the Microprocessor 49 or the audio processor may be independent of the Microprocessor 49.

Similar to the Scanning method, motion of components of the system 531 occurring while taking range measurements will result in a range measurement error. If the time required to take the range measurements is short, then this error will be very small. Accordingly, this error is negligible for the most practical cases, but if it is desired, can be accounted for by the addition of an accelerometer coupled to the Microprocessor 49 to compensate for any motion detected by the accelerometer. In one embodiment, the accelerometer is a gyro accelerometer. In another embodiment, the accelerometer is a mercury accelerometer, a pendulum accelerometer, or any other type of accelerometer well known in the industry.

It should be noted that while the presently disclosed method and apparatus is described as having several alternative embodiments, the claimed invention is defined by the claims and not by any particular disclosed embodiment. Accordingly, those skilled in the art will recognize that several additional alternative embodiments might be possible without departing from the scope of the claimed invention.

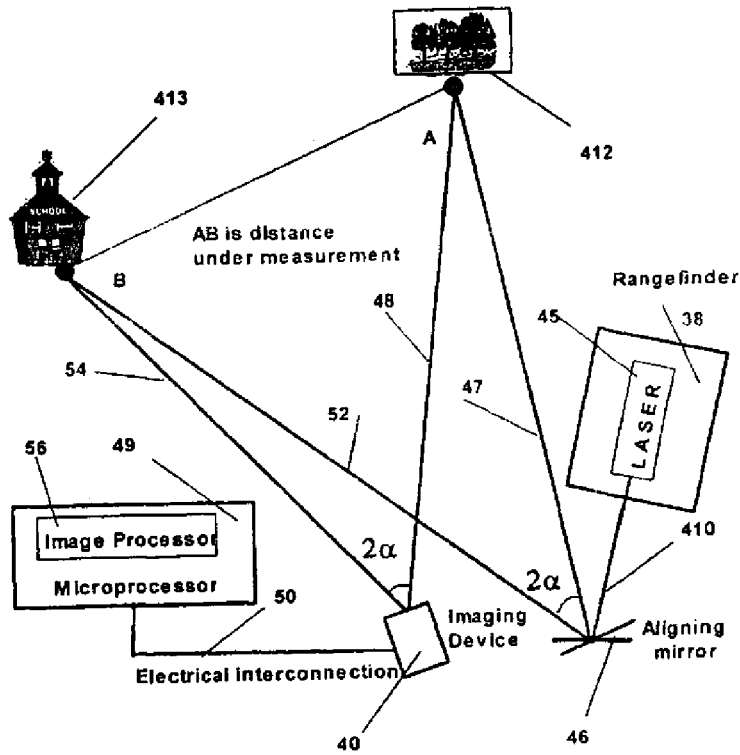

We claim:

1. A method of remotely measuring the distance between two points in space within a field-of-view, the method comprising:
   a. directing a rangefinder to measure the range to a first point of interest;
   b. directing the rangefinder to measure the range to a second point of interest;
   c. directing a laser beam to a micro-opto-electro-mechanical systems (MOEMS) scanner; and
   d. applying a proper AC voltage to the MOEMS scanner to cause the MOEMS scanner to scan the laser beam over a scan line, the endpoints of the scan line coinciding with the two points of interest.
   e. applying a proper biased DC voltage to the MOEMS scanner to bring scan mirror to horizontal position; and
   f. determining the scan angle based upon the level of the AC voltage applied to the MOEMS scanner; and
   g. calculating the distance between the two points of interest based upon the range measurements to the points of interest and the determined scan angle; and
   h. Mounting the MOEMS scanner on a scanner positioner with 3-directional movement.

2. The method of claim 1, wherein directing the rangefinder is done by applying a DC voltage to the scanner positioner.

3. The method of claim 1, wherein the calculated distance is displayed.

4. The method of claim 1, wherein the calculated distance is displayed in real time.

5. The method of claim 1, wherein the information regarding motion of the scanner positioner is received from an accelerometer.

6. The method of claim 5, wherein the accelerometer is a gyro accelerometer.

7. The method of claim 1, wherein the calculated distance is given as an audible response.

* * * * *

UNITED STATES PATENT AND TRADEMARK OFFICE
CERTIFICATE OF CORRECTION

PATENT NO. : 7,706,573 B1  Page 1 of 6
APPLICATION NO. : 11/230226
DATED : April 27, 2010
INVENTOR(S) : Manouchehr E. Motamedi and Ali E. Dabiri It is certified that error appears in the above-identified patent and that said Letters Patent is hereby corrected as shown below:

The title page, showing an illustrative figure, should be deleted and substitute therefor the attached title page.

Delete drawing sheets 1, 2, 3, and 5 and substitute therefor the drawing sheets, consisting of figures 1a, 1b, 2, and 4 as shown on the attached pages.

Signed and Sealed this

Twenty-seventh Day of July, 2010

David J. Kappos
*Director of the United States Patent and Trademark Office*

(12) United States Patent
Motamedi et al.

(10) Patent No.: US 7,706,573 B1
(45) Date of Patent: Apr. 27, 2010

(54) REMOTE DISTANCE-MEASUREMENT BETWEEN ANY TWO ARBITRARY POINTS USING LASER ASSISTED OPTICS

(76) Inventors: Manouchehr E. Motamedi, 756 Paseo De Leon, Newbury Park, CA (US) 91320; Ali E. Dabiri, 2290 Middleton Way, San Diego, CA (US) 92109

( * ) Notice: Subject to any disclaimer, the term of this patent is extended or adjusted under 35 U.S.C. 154(b) by 1127 days.

(21) Appl. No.: 11/230,226

(22) Filed: Sep. 19, 2005

(51) Int. Cl.
*G06K 9/00* (2006.01)
(52) U.S. Cl. .................................. 382/106
(58) Field of Classification Search .............. 359/196.1, 359/197.1, 198.1, 199.1, 202, 212.1, 212.2, 359/213.1, 214.1, 223, 224, 290–295; 250/234, 250/252.1; 235/462, 470
See application file for complete search history.

(56) References Cited

U.S. PATENT DOCUMENTS 5,903,380 A   5/1999  Motamedi et al. ...... 359/224.15
6,094,289 A   7/2000  Moranski et al. ....... 359/223.14

OTHER PUBLICATIONS

M. E. Motamedi, Optical Engineering Journal, special issue in "Micro-opto-electro-mechanical systems", Optical Eng. vol. 36, No. 5, May 1997.
M.E. Motamedi, et al, "MOEM Scan Engine for Barcode Reading and Factory Automation," SPIE Proceeding of Miniaturized Systems with Microoptics and Micromechanics III, vol. 3276, pp. 66-80 San Jose, 1998.

*Primary Examiner*—Samir A Ahmed
*Assistant Examiner*—Atiba O Fitzpatrick

(57) ABSTRACT

The disclosed method measures the distance between two arbitrary points of interest from the user position by determining the range and angle between the two points. To measure the angle between the two points, a first method uses a micro-opto-electro-mechanical scanner to form a scan line between the two points of interest. A scan angle is determined based on the applied AC voltage needed to cause the endpoints of the scan line to coincide with the points of interest. The second method, an image-processing method, is applied to determine the angles between the points of interest. A Microprocessor uses captured images including the points of interest to determine the angle between the points. In both methods, the Microprocessor calculates the distance between the two points of interest by using the determined angle, together with the measured ranges and sends the calculated distance to a display.

7 Claims, 6 Drawing Sheets

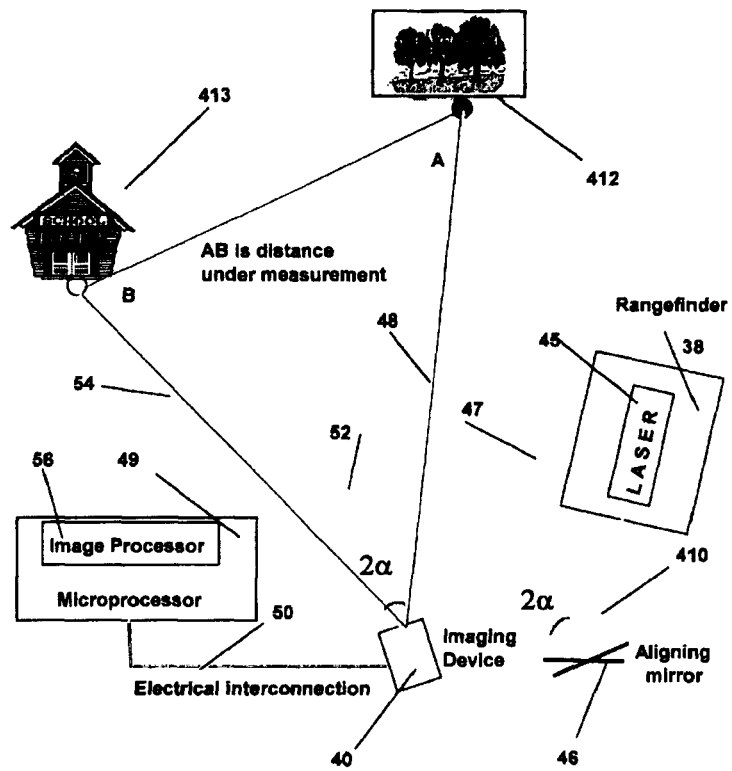

UNITED STATES PATENT AND TRADEMARK OFFICE
CERTIFICATE OF CORRECTION

PATENT NO.         : 7,706,573 B1
APPLICATION NO. : 11/230226
DATED                 : April 27, 2010
INVENTOR(S)       : Manouchehr E. Motamedi and Ali E. Dabiri It is certified that error appears in the above-identified patent and that said Letters Patent is hereby corrected as shown below:

The title page, showing an illustrative figure, should be deleted and substitute therefor the attached title page.

Delete drawing sheets 1, 2, 3, and 5 and substitute therefor the drawing sheets, consisting of figures 1a, 1b, 2, and 4 as shown on the attached pages.

This certificate supersedes the Certificate of Correction issued July 27, 2010.

Signed and Sealed this

Twenty-first Day of September, 2010

David J. Kappos
*Director of the United States Patent and Trademark Office*

(12) United States Patent
Motamedi et al.

(10) Patent No.: US 7,706,573 B1
(45) Date of Patent: Apr. 27, 2010

(54) REMOTE DISTANCE-MEASUREMENT BETWEEN ANY TWO ARBITRARY POINTS USING LASER ASSISTED OPTICS

(76) Inventors: Manouchehr E. Motamedi, 756 Paseo De Leon, Newbury Park, CA (US) 91320; Ali E. Dabiri, 2290 Middleton Way, San Diego, CA (US) 92109

(*) Notice: Subject to any disclaimer, the term of this patent is extended or adjusted under 35 U.S.C. 154(b) by 1127 days.

(21) Appl. No.: 11/230,226

(22) Filed: Sep. 19, 2005

(51) Int. Cl.
G06K 9/00 (2006.01)
(52) U.S. Cl. .................................. 382/106
(58) Field of Classification Search ............. 359/196.1, 359/197.1, 198.1, 199.1, 202, 212.1, 212.2, 359/213.1, 214.1, 223, 224, 290–295; 250/234, 250/252.1; 235/462, 470
See application file for complete search history.

(56) References Cited
U.S. PATENT DOCUMENTS 5,903,380 A   5/1999   Motamedi et al. ...... 359/224.15
6,094,289 A   7/2000   Moranski et al. ....... 359/223.14

OTHER PUBLICATIONS

M. E. Motamedi, Optical Engineering Journal, special issue in "Micro-opto-electro-mechanical systems", Optical Eng. vol. 36, No. 5, May 1997.
M.E. Motamedi, et al, "MOEM Scan Engine for Barcode Reading and Factory Automation," SPIE Proceeding of Miniaturized Systems with Microoptics and Micromechanics III, vol. 3276, pp. 66-80 San Jose, 1998.

*Primary Examiner*—Samir A Ahmed
*Assistant Examiner*—Atiba O Fitzpatrick

(57) ABSTRACT

The disclosed method measures the distance between two arbitrary points of interest from the user position by determining the range and angle between the two points. To measure the angle between the two points, a first method uses a micro-opto-electro-mechanical scanner to form a scan line between the two points of interest. A scan angle is determined based on the applied AC voltage needed to cause the endpoints of the scan line to coincide with the points of interest. The second method, an image-processing method, is applied to determine the angles between the points of interest. A Microprocessor uses captured images including the points of interest to determine the angle between the points. In both methods, the Microprocessor calculates the distance between the two points of interest by using the determined angle, together with the measured ranges and sends the calculated distance to a display.

7 Claims, 6 Drawing Sheets